(12) United States Patent
Shimma

(10) Patent No.: US 7,821,894 B2
(45) Date of Patent: Oct. 26, 2010

(54) METHOD AND APPARATUS FOR RECORDING INFORMATION ONTO AND REPRODUCING INFORMATION FROM A RECORDING MEDIUM AND MANAGING A DEFECTIVE AREA IN A RECORDING MEDIUM

(75) Inventor: Naoki Shimma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 465 days.

(21) Appl. No.: 11/870,187

(22) Filed: Oct. 10, 2007

(65) Prior Publication Data

US 2008/0101186 A1 May 1, 2008

(30) Foreign Application Priority Data

Oct. 31, 2006 (JP) ............................. 2006-296136

(51) Int. Cl.
*G11B 7/00* (2006.01)
(52) U.S. Cl. .................................................. 369/53.15
(58) Field of Classification Search ........................ None
See application file for complete search history.

(56) References Cited

U.S. PATENT DOCUMENTS

| | | | | |
|---|---|---|---|---|
| 5,898,535 A | * | 4/1999 | Kawai | 360/77.02 |
| 6,189,118 B1 | * | 2/2001 | Sasaki et al. | 714/710 |
| 6,501,905 B1 | * | 12/2002 | Kimura | 386/126 |
| 6,545,832 B1 | * | 4/2003 | Sugawara et al. | 360/53 |
| 7,016,275 B1 | | 3/2006 | Lee et al. | 369/47.14 |
| 7,203,153 B2 | | 4/2007 | Kuraoka et al. | 369/275.3 |
| 7,414,938 B2 | | 8/2008 | Kuraoka et al. | 369/53.1 |
| 2004/0233803 A1 | * | 11/2004 | Kawamae et al. | 369/47.3 |
| 2005/0169132 A1 | | 8/2005 | Kuraoka et al. | 369/47.14 |
| 2005/0270944 A1 | * | 12/2005 | Yoshida et al. | 369/53.17 |
| 2007/0140097 A1 | | 6/2007 | Kuraoka et al. | 369/275.3 |
| 2007/0201321 A1 | * | 8/2007 | Sasaki | 369/44.13 |
| 2008/0279072 A1 | | 11/2008 | Kuraoka et al. | 369/53.17 |

FOREIGN PATENT DOCUMENTS

| | | |
|---|---|---|
| JP | 5-135502 | 6/1993 |
| JP | 2000-315358 | 11/2000 |
| JP | 2004-280864 | 10/2004 |

OTHER PUBLICATIONS

Japanese Office Action dated Oct. 28, 2008, issued in corresponding Japanese patent application No. 2006-296136.

* cited by examiner

*Primary Examiner*—Peter Vincent Agustin
(74) *Attorney, Agent, or Firm*—Fitzpatrick, Cella, Harper & Scinto

(57) ABSTRACT

The method and apparatus can register defective areas in a recording medium not having a dedicated sparing area. A data recording area and a sparing area are not preliminarily divided. When a defective area is found, data is transferred to another area in the recording area, and the defective area is registered as being in a recorded state in a table for managing the recorded state in each of the recording areas.

7 Claims, 6 Drawing Sheets

METHOD AND APPARATUS FOR RECORDING INFORMATION ONTO AND REPRODUCING INFORMATION FROM A RECORDING MEDIUM AND MANAGING A DEFECTIVE AREA IN A RECORDING MEDIUM

BACKGROUND OF THE INVENTION

1. Field of the Invention

The present invention relates to a method and apparatus for recording and reproducing information onto and from a rewritable recording medium, and particularly to a method for recording and reproducing information onto and from a recording medium and managing a defective area in the recording medium.

2. Description of the Related Art

In general, data is repeatedly recorded on a rewritable recording medium. Because of degradation of a recording layer or the like after repeated use, defective areas may occur, which can lead to errors in a data reproduction or recording process. Such defective areas may be caused not only by the degradation but also by scratches, adhesion of dust, fabrication errors, or the like. Therefore, in rewritable recording media, defective areas need to be managed in order to prevent recording or reproduction of data in defective areas.

In a digital-versatile-disk-rewritable (DVD-RW) format, for example, defective areas are managed by using a sparing area dedicated for data replacement and a sparing table for managing addresses of defective blocks and addresses of replacement blocks in the form of a table. The sparing area and the sparing table are located in a management information area of a universal-disk-format (UDF) file system.

FIG. 4 illustrates processing performed in the management. Reference characters A, B, C, and D in FIG. 4 indicate addresses of blocks in a DVD-RW. In DVD-RWs, defect information is registered on a block basis. For example, when blocks indicated by addresses of the reference characters C and D are determined as defective as a result of verification, replacement is performed by using a sparing area. Then, addresses of the defective blocks and addresses of blocks for replacement data in the sparing area are registered in pairs on the sparing table. In order to reproduce data, data access is performed by reading the replacement addresses in the sparing area in place of the addresses of the defective blocks with reference to the sparing table. That is, as shown in the table in FIG. 4, data access is performed by reading the block address A in place of C and the block address B in place of D. An example of the related art is disclosed in Japanese Patent Laid-Open No. 5-135502.

In such a known method for managing defective areas, however, processing of a file system becomes complicated and the user area is limited because of inclusion of the sparing area.

SUMMARY OF THE INVENTION

The present invention provides a method for recording and reproducing information in which defective areas can be managed even in a medium not having a sparing area.

According to the present invention, a method for recording and reproducing information onto and from a recording medium having a plurality of recording areas is provided. The method includes the steps of finding, while performing recording or reproduction, a defective area in one or more of the recording areas onto or from which the information is recorded or reproduced; and registering the defective area, if found, as being in a recorded state in a table for managing whether or not each of the recording areas on the recording medium is in a recorded state.

Also according to the present invention, an apparatus for recording and reproducing information onto and from a recording medium having a plurality of recording areas is provided. The apparatus includes a recording/reproducing processing unit for performing recording or reproduction and a control unit. The recording/reproducing processing unit finds, during recording or reproduction, a defective area in one or more of the recording areas onto or from which the information is recorded or reproduced. The control unit controls the recording/reproducing processing unit and registers the defective area, if found by the recording/reproducing processing unit, as being in a recorded state in a table for managing whether or not each of the recording areas on the recording medium is in a recorded state.

Further features of the present invention will become apparent from the following description of exemplary embodiments with reference to the attached drawings.

DESCRIPTION OF THE EMBODIMENTS

An embodiment of the present invention will now be described in which the invention is applied to a DVD-RW format as an example.

Figure 2:
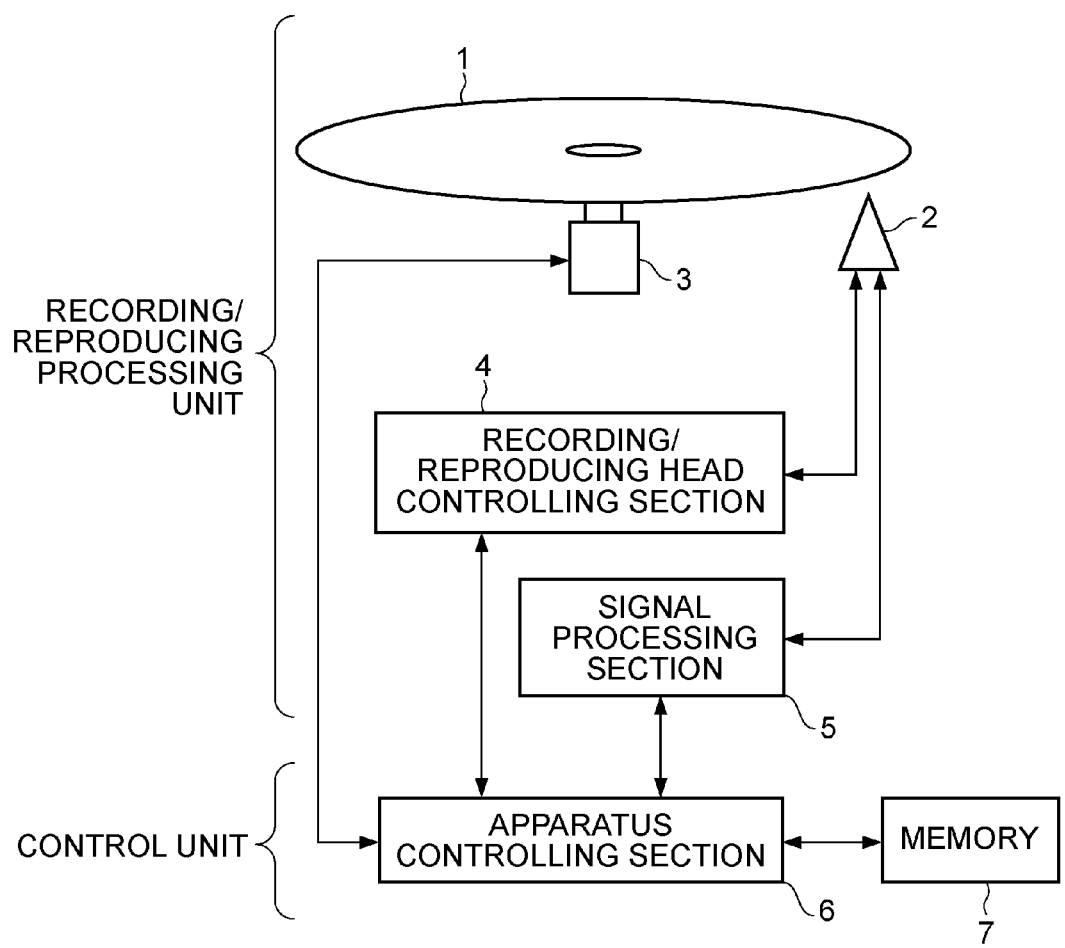
FIG. 2 is a schematic diagram of a recording/reproducing apparatus that performs a method for recording and reproducing information according to the present invention.

FIG. 2 illustrates an example of an information recording/reproducing apparatus that performs a method for recording and reproducing information according to the present invention. In this case, the example is an optical disk recording/reproducing apparatus. A reference numeral 1 in FIG. 2 indicates a recording medium capable of recording and reproducing data, a DVD-RW medium in this embodiment. The optical disk recording/reproducing apparatus includes a recording/reproducing head 2 serving as a section for performing recording or reproduction, a disk motor 3 for rotating the recording medium 1, a recording/reproducing head controlling section 4 for controlling the location of the recording/reproducing head 2, a signal processing section 5 for demodulating a signal reproduced by the recording/reproducing head 2 and for modulating the signal to be recorded by the recording/reproducing head 2, an apparatus controlling section 6 for controlling the disk motor 3, the recording/reproducing head controlling section 4, and the signal processing section 5, and a memory 7 for temporarily storing defect information. As the memory, in the case of a video camera, part of a shockproof memory may be used temporarily. In the case of a personal computer (PC), a memory built in the PC may be used. Hereinafter, the aforementioned parts 1 to 5 will be referred to as a recording/reproducing processing unit, and the aforementioned parts 6 and 7 will be referred to as a control unit.

Figure 3:
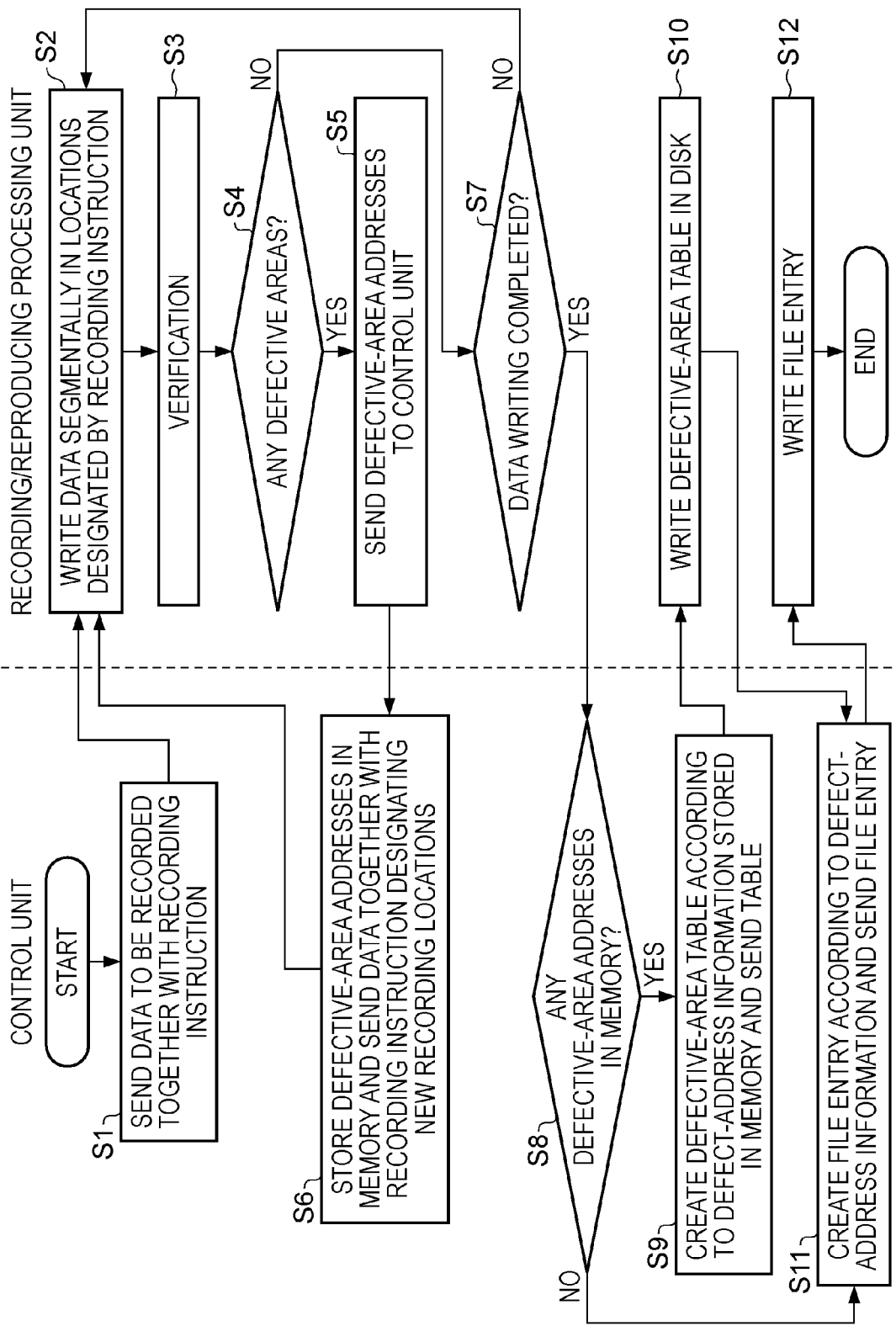
FIG. 3 is a flow chart showing the method for recording and reproducing information according to the present invention.
Figure 4:
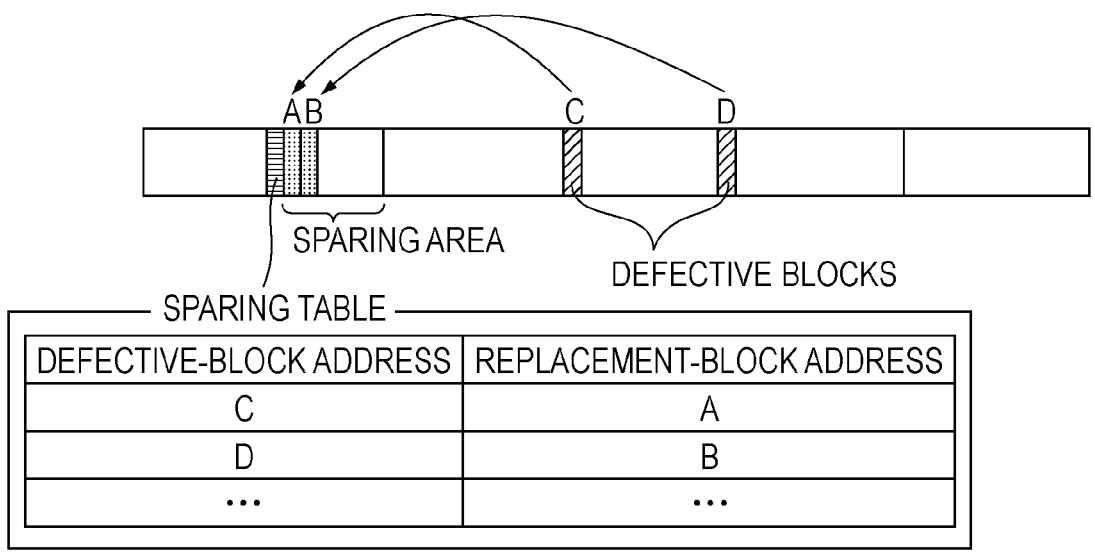
FIG. 4 illustrates a known replacement method.

FIG. 3 is a flow chart showing a process for managing defective areas in a recording medium during recording in the present invention. In this case, a DVD-RW as the recording medium is managed in a UDF file system. In step S1, in order to perform recording, the control unit first sends data to be recorded and a recording instruction containing recording locations or the like to the recording/reproducing processing unit. In step S2, upon reception of the recording instruction, the recording/reproducing processing unit segmentally records the data in locations (in a user data area) designated by the recording instruction. The segmentation is based on recording performance. For example, in the case where recording performance of the recording/reproducing processing unit allows for recording of 10 blocks per processing, a recording instruction for data containing 100 blocks is divided into 10 segments so as to be individually processed. The recorded data is sequentially subjected to verification in step S3. In step S4, if any defective areas (defective blocks) are found in the recording medium as a result of the verification, the process proceeds to step S5 where the recording/reproducing processing unit sends the locations (addresses) of the defective areas to the control unit. Hereinafter, the location of a defective area will be referred to as a defective-area address. In step S6, the control unit that has received the defective-area addresses stores the defective-area addresses in the memory and sends a recording instruction designating new recording locations (in the user data area) to the recording/reproducing processing unit. The process then returns to step S2 where the recording/reproducing processing unit that has received the new recording instruction writes the data in the designated locations. Then in step S3, verification is performed for the new recording locations. If any defective areas are found, the defective-area addresses are accordingly sent to the control unit in step S5. When writing of all data is completed in step S7, the process proceeds to step S8 where the control unit checks whether the memory has any defective-area addresses. If the memory has defective-area addresses, the process proceeds to step S9 where the control unit creates a defective-area table in accordance with the defective-area addresses and sends the table to the recording/reproducing processing unit. In step S10, the recording/reproducing processing unit writes the defective-area table in the locations instructed by the control unit. In step S11, the control unit creates a file entry in accordance with the defect-address information and sends the file entry to the recording/reproducing processing unit. Then, in step S12, the recording/reproducing processing unit that has received the file entry writes the file entry in the recording medium in accordance with the UDF standard. If no defective-area addresses are found in step S8, the process proceeds to step S11 where the control unit creates a file entry as a routine procedure and sends the file entry to the recording/reproducing processing unit. Then, in step S12, the recording/reproducing processing unit records the file entry to complete the process.

Now, details of the process will be described.

In step S5, the locations of defective areas, i.e., the address values of defective blocks, are sent to the control unit. In step S6, the control unit temporarily stores the address values as defect information in the memory. Further, in step S6, a block address of a location other than areas already registered as recorded areas or defective areas is designated.

In step S9, data based on the defect addresses stored in the memory is created in a space bitmap, a defect status bitmap, or a similar format. The data is then sent as the defective-area table to the recording/reproducing processing unit. Details about the space bitmap and the defect status bitmap, and the data format used in recording the defective-area information will be described below.

Figure 1:
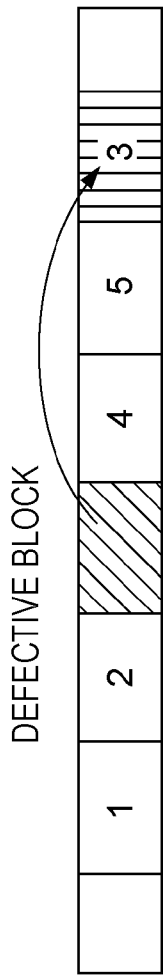
FIG. 1 illustrates a method for registering defective areas according to the present invention.

The process performed in step S10 will be described below with reference to FIG. 1. In this step, first, a block having a defect is registered as a recorded block. In this registration, space bitmap is used. In a DVD-RW, an area called a space bitmap is provided within the UDF file system, in which information denoting whether or not data is recorded in each block is registered. All the sectors in a recording medium are allocated one bit, in which a recorded sector is set to 1, and an unrecorded sector is set to 0. In the invention, a block determined to be a defective block is set to 1 in the space bitmap, similarly to the case of a recorded sector, so as to set the block in a recorded state. Because 1 block corresponds to 16 sectors, when a defective block is found, 1 is set for 16 bits. In FIG. 1, a row corresponds to a block (=16 sectors).

Figure 7:
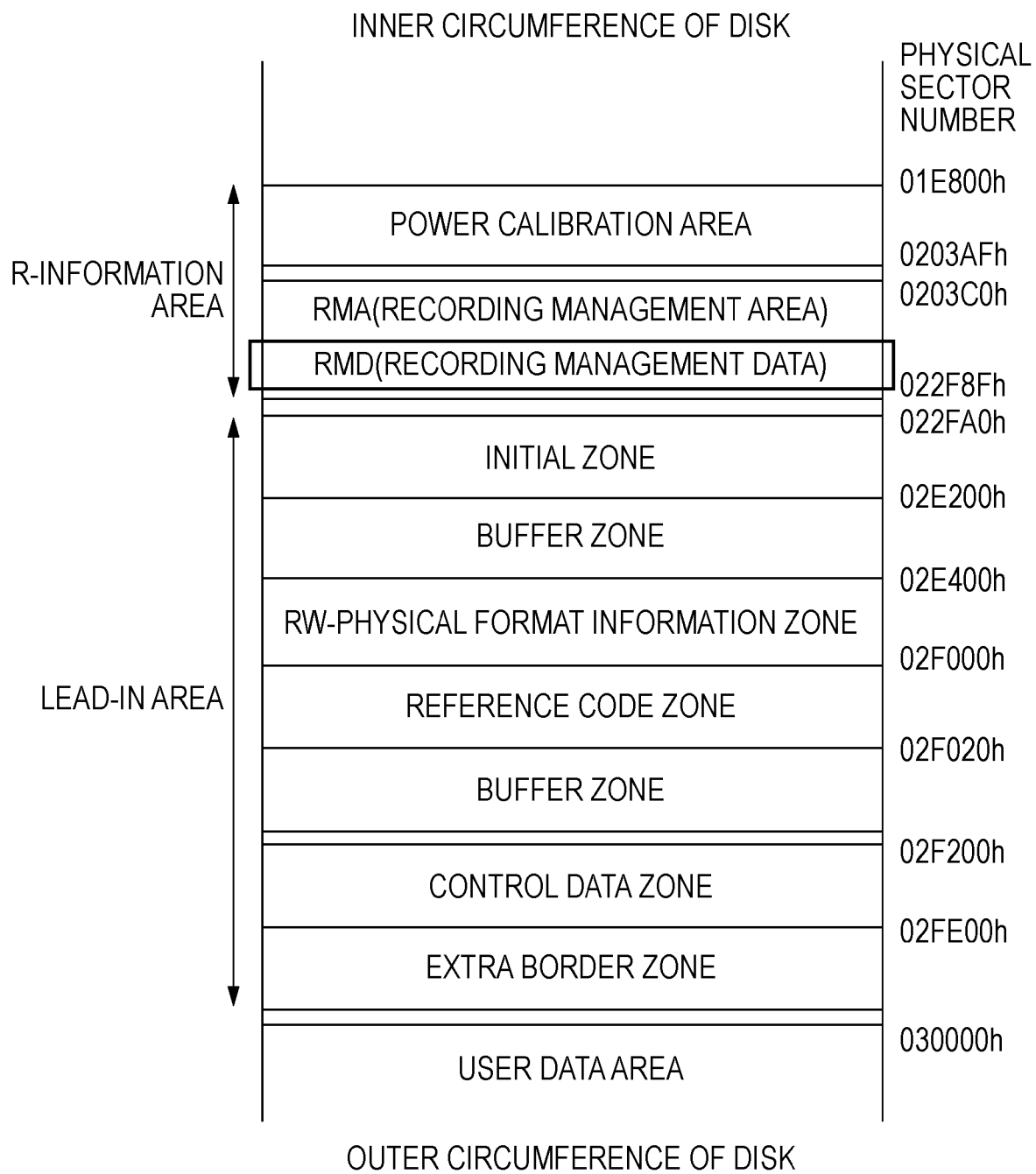
FIG. 7 illustrates the location of recording management data (RMD).

However, this process itself does not provide any distinction between recorded blocks and defective blocks after recordation, that is, it does not mean that the defective-area information is registered. Among some methods for registering defective-area information is a method using a defect status bitmap. In this method, after defective blocks are registered as recorded blocks in the space bitmap, the defective blocks are further registered using the defect status bitmap within recording management data (RMD), which is management information for a DVD. Unlike in the case of a space bitmap, because the defective blocks are managed on a block basis, 16 sectors correspond to 1 bit. Referring to FIG. 7, RMD is located in sectors corresponding to physical sector numbers (hereinafter referred to as PSNs) 0203C0h to 022F8Fh in a DVD. In FIG. 7, a portion enclosed with a box is the RMD.

Figure 8:
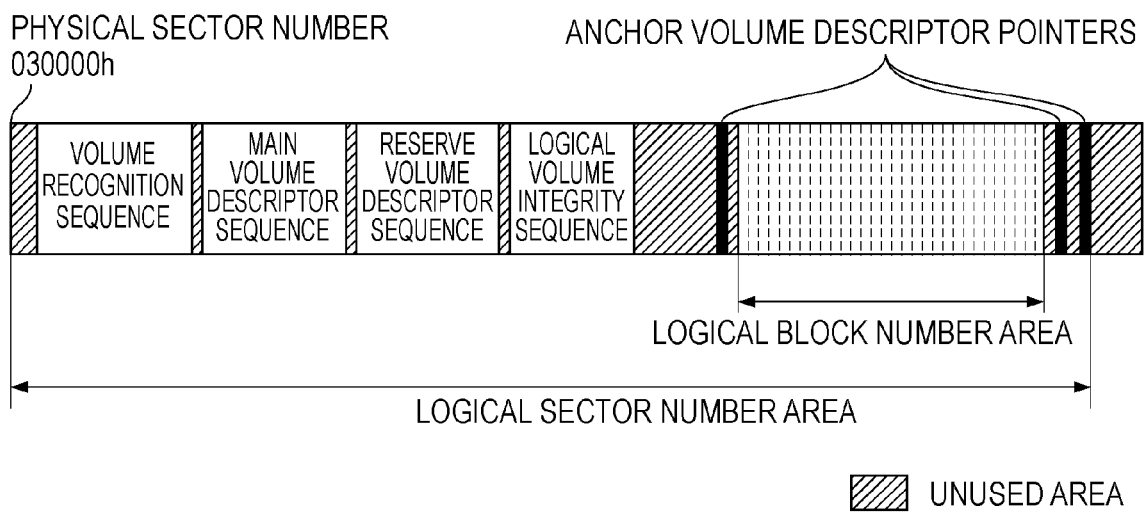
FIG. 8 illustrates the structure of defective-area information.
Figure 9:
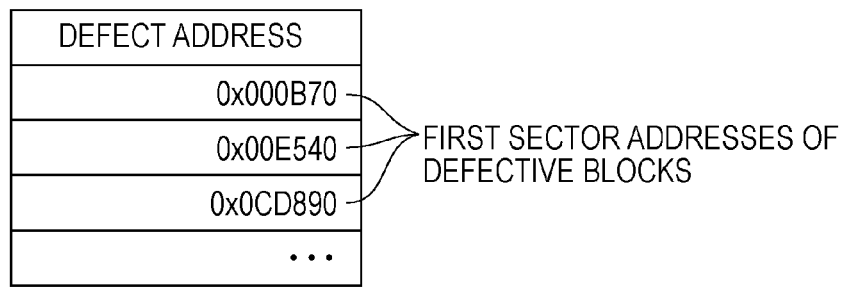
FIG. 9 illustrates an example of data format for defective-area information.

Because a defect status bitmap is originally provided in the DVD-RW standard, if defective blocks are registered using this method, defective area management can be performed in conformity with the DVD standard and the UDF standard. However, because the RMD is management information of a disk, it cannot be accessed from a file system. Therefore, the following method may be alternatively used. Although the method does not conform to the UDF standard, management can be performed using the file system. More specifically, in an unused area within the file system, defective-area information is registered (recorded) using an area other than a user area. A format used for the registration may be a bitmap format similar to a defect status bitmap, or a format in which only the first sector addresses of defective blocks are simply listed, as shown in FIG. 9. FIG. 8 shows an example of a UDF file system. When the defective area management is performed by recording the defective-area information within the file system, an unused area not yet included in the logical block number area is used to record information of the defective blocks.

Figure 5:
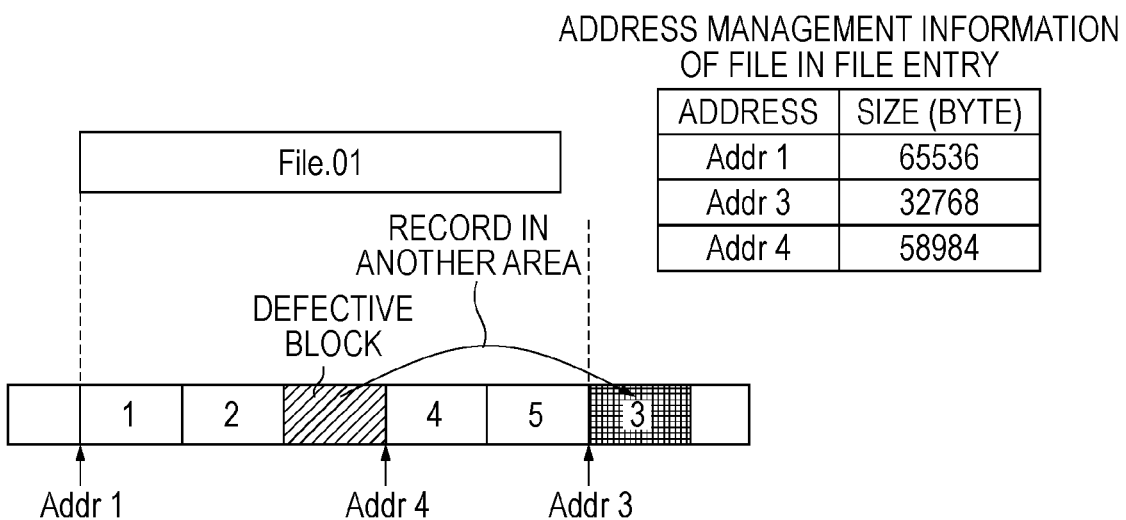
FIG. 5 illustrates a method for managing addresses of a file recorded in segments.

Step S11 is a step in which a logical address used in actually accessing recorded data is recorded. In the UDF, a file recorded in a disk is accessed through a file entry. Depending on the version of the UDF, a file may be accessed using an extended file entry. For the case that a single file is recorded in a disk in segments, a plurality of allocation descriptors (hereinafter referred to as ADs) can be recorded in the file entry. In each of the ADs, a logical address that indicates the location of a file and the size of the file are recorded. For example, when a defective area is found during recording of data, the data is recorded in another area. FIG. 5 shows a case where a file (File. 01) having a size occupying 5 blocks is recorded in segments. In this case, in an AD of the file entry, the logical address (Addr 1) where the first block begins is recorded, and the size of the successively recorded first and second blocks is recorded in bytes. Because 1 block corresponds to 16 sectors, and 1 sector corresponds to 2048 bytes, 2 blocks correspond to 65536 bytes. Similarly, for the logical address (Addr 3) where the third block begins the size of the third block (32768) is recorded, and for the logical address (Addr 4) where the fourth block begins the remaining file size (58984) is recorded. As in this example, if the file size to be recorded in the last row of the ADs is not a multiple of a block size, the remaining file size is recorded. In accessing a file, the file system accesses in the order of the blocks recorded in the ADs. According to this method, an AD indicating a logical address of a defective block does not exist, that is, a defective block is treated as if it does not exist in the logical addresses. Accordingly, because a block once registered as a defective block is also registered as a recorded block, the defective block will not be accessed afterwards.

In the invention, a defective block is registered as being in a recorded state as well as a defective block. Thus, unlike in the case of a sparing table or the like, it is not necessary to read the address of a replacement block in place of the address of a defective block in accessing data. Further, in recording, it is not necessary to check every time whether or not a block is defective prior to a recording process. This simplifies a process performed by the file system.

Figure 6:
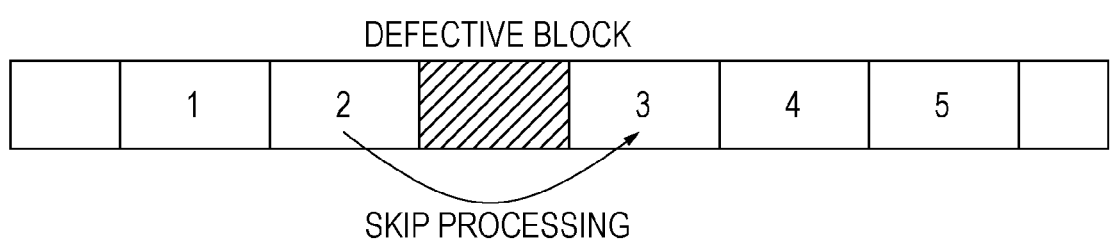
FIG. 6 illustrates skip processing.

When a recording medium with defective areas registered using a method according to the invention is to be initialized, the space bitmap is also initialized. However, after the initialization, by referring to the registered defective-area information, the recording medium can again be made to be in a state in which the defective areas are registered as recorded in the space bitmap. By performing this process, defective areas can be preliminarily identified when recording stream data or the like. As a result, as shown in FIG. 6, skip processing can be performed in which a defective area is skipped so that data is recorded in the next available block.

The above description has been made taking a DVD-RW, which is an optical recording medium, as an example. However, the invention is also applicable to any other recording media in which defective areas need to be managed, such as a magnetic recording medium including a semiconductor memory such as a flash memory, a floppy (registered trademark) disk, and a hard disk drive.

Further, not only in recording, but also in reproduction, a similar process can be performed when a defective area is found. In the case of reproduction, however, data is not re-recorded in another area. Alternatively, the data is re-read in the same area. If an error rate clarified in an error correction process exceeds a predetermined value, even a data-readable area may be registered and processed as a defective area because it is highly possible that the data will become unreadable in the future.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Application No. 2006-296136 filed Oct. 31, 2006, which is hereby incorporated by reference herein in its entirety.

What is claimed is:

1. A method of recording information onto and reproducing information from a rewriteable recording medium having a plurality of recording areas, the method comprising the steps of:

registering, when a defective area is found in one or more of the recording areas onto which the information is recorded or from which the information is reproduced while performing recording or reproduction, the defective area as being in a recorded state in a table for managing whether each of the recording areas on the rewriteable recording medium is in the recorded state; and registering, when initializing the table for managing whether each of the recording areas on the rewriteable recording medium is in the recorded state, the registered defective area as being in the recorded state in the table, for managing whether each of the recording areas is in the recorded state, in accordance with defective-area information recorded in the rewriteable recording medium.

2. The method of recording and reproducing information according to claim 1, wherein the recording includes performing verification and, when a defective area is found in the verification, information to be originally recorded in the found area is rewritten into another recording area registered in the table as being in an unrecorded state.

3. The method of recording and reproducing information according to claim 1, further comprising the step of creating defective-area information for registering an address of the defective area.

4. The method of recording and reproducing information according to claim 3, wherein the defective-area information is recorded in a management information recording area of the rewriteable recording medium.

5. The method of recording and reproducing information according to claim 3, wherein the defective-area information is recorded in an unused area of a file system area.

6. The method of recording and reproducing information according to claim 4, wherein the defective-area information is recorded in a recording management data area in a DVD format.

7. The method of recording and reproducing information according to claim 1, wherein an initialization of the rewriteable recording medium includes registering, when initializing the table for managing whether each of the recording areas on the rewriteable recording medium is in the recorded state, the defective area.

* * * * *